A. COSTA.
CARBURETER.
APPLICATION FILED OCT. 15, 1914.

1,184,695. Patented May 23, 1916.

WITNESSES:
O. M. Kappler
H. B. Fay

INVENTOR
Anthony Costa
BY Fay & Oberlin
ATTORNEYS

UNITED STATES PATENT OFFICE.

ANTHONY COSTA, OF CLEVELAND, OHIO, ASSIGNOR OF TWO-TWENTIETHS TO AMOS McGRAW AND FIVE-TWENTIETHS TO JAMES BOYLE, BOTH OF YOUNGSTOWN, OHIO, AND THREE-TWENTIETHS TO WILLIAM FAHEY, FOUR-TWENTIETHS TO FRED J. KELLER, AND FOUR-TWENTIETHS TO HENRY J. MUEHLHAUSER, ALL OF CLEVELAND, OHIO.

CARBURETER.

1,184,695.  Specification of Letters Patent.  Patented May 23, 1916.

Application filed October 15, 1914. Serial No. 866,785.

*To all whom it may concern:*

Be it known that I, ANTHONY COSTA, a citizen of the United States, and a resident of Cleveland, county of Cuyahoga, and State of Ohio, have invented a new and useful Improvement in Carbureters, of which the following is a specification, the principle of the invention being herein explained and the best mode in which I have contemplated applying that principle, so as to distinguish it from other inventions.

My improvements relate, as indicated, to a method of vaporizing hydro-carbon fuels, together with an improved type of apparatus designed to efficiently carry out the method.

It is the object of the present invention to provide a method and apparatus which will so finely divide liquid fuel, that the same will be instantly and completely vaporized, thus forming a complete and intimate intermixture of the fuel and air and accordingly securing a very high efficiency in the engine to which the mixture is supplied.

A further step in my improved method consists in breaking up the column of air and fuel which is first formed by passing a column of air across the same, this action resulting in an even more complete and thorough intermixture of the air and fuel.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
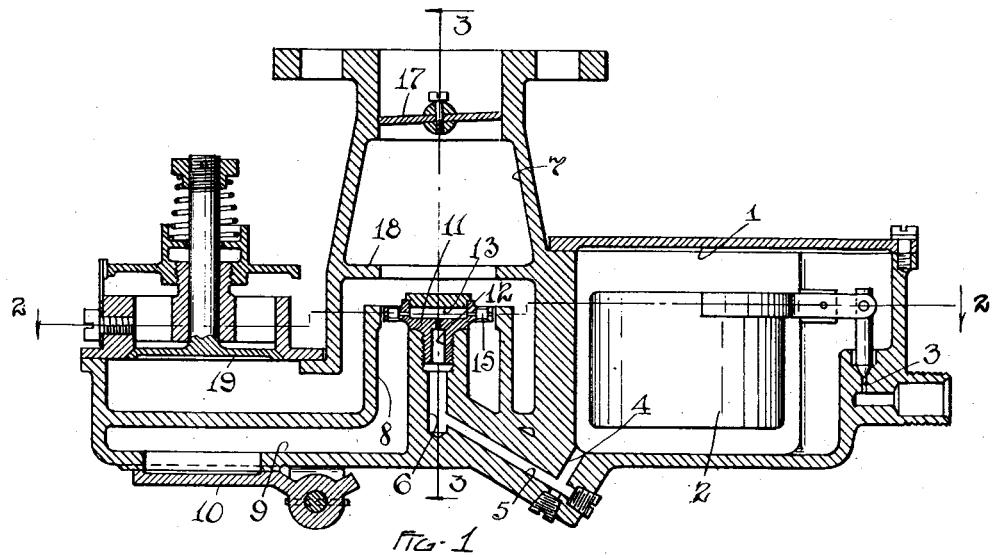
Figure 2:
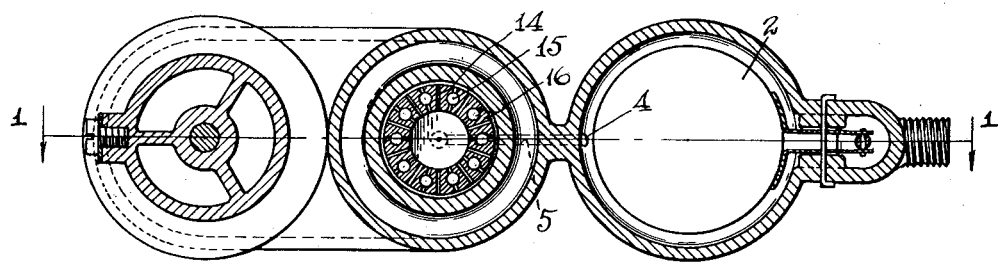
Figure 3:
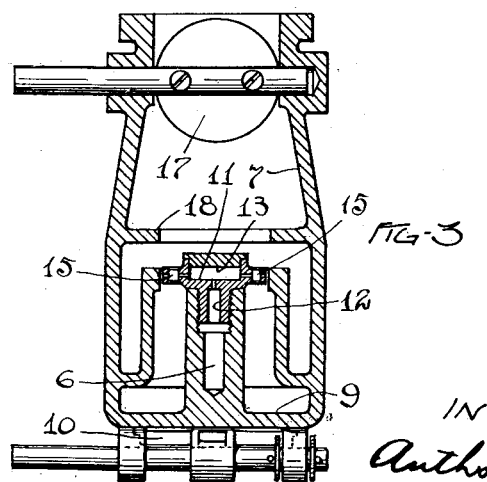

In said annexed drawing:—Figure 1 is a vertical section through my improved apparatus, the plain of section being indicated by the line 1—1 in Fig. 2; Fig. 2 is a horizontal section on the line 2—2 in Fig. 1; and Fig. 3 is a vertical section on the line 3—3 in Fig. 1.

In Fig. 1 there are shown a float chamber 1 of the usual construction having therein a float 2 controlling an entrance passage 3 for the admission of the hydro-carbon fuel, such as gasolene, for example, to such chamber. Leading from the bottom of the float chamber 1 is a conduit 4 intersecting a second conduit 5 leading to the base of a cylindrical up-standing conduit 6 mounted in the lower part of a substantially cylindrical mixing chamber 7 which is preferably cast integrally with the float chamber 1.

Surrounding the conduit 6 and concentric therewith is an up-standing collar 8 forming a cylindrical space about the conduit 6, such space being connected at its lower end with a main air supply passage 9 controlled by a pivoted valve 10 which will normally be opened during the operation of the engine to which the apparatus will be attached. The top of the collar 8 extends some little distance above the top of the conduit 6 and the latter will be internally threaded to permit of the removable seating therein of a block or plug 11 having a passage 12 formed centrally therein connecting with the passage in the conduit 6. The upper portion of the block 11 is in the form of a hollow disk having a flat cylindrical chamber 13 which connects with the passage 12. Extending radially outward from the chamber 13 which constitutes the hollow portion of the disk, are a plurality of small apertures 14 which are spaced at equal distances from each other and are disposed about the entire circumference of the plug 11. These apertures 14 are disposed in a substantially horizontal plane and between each two adjacent apertures 14 there is provided a vertical opening 15. Through these openings 15 extend other apertures or conduits 16 which lead radially outward from the chamber 13 to the outside of the disk, as do the apertures 14. The outside of the disk which forms the top of the plug 11 is concentric within, and is spaced a slight distance from, the inside surface of the top of the collar 8.

In the upper part of the mixing chamber 7 there is mounted the usual throttle valve 17 which controls the supply of fuel to the engine. Extending inwardly from the sides of the mixing chamber at a height some little distance above the top of the collar 8 is a ledge or shoulder 18 constituting a preferred form of baffle plate which will cause any air which passes up around the outside of the collar 7 to be directed transversely across the direction of movement of the column of mixed air and gas which issues from the openings in the plug 11 and from between the plug 11 and the collar 8. The air which enters the mixing chamber outside of the collar 8 is admitted to such chamber through an auxiliary air valve 19 which may be of any desired construction and the operation of which will be obvious from Fig. 1. Attention is called to the fact that this auxiliary air will pass up through mixing chamber in the form of a cone and will thus strike the main air and gas at an acute angle to the direction of movement of same. This cross-current of air striking the main current of air and gas will completely vaporize any small globules of liquid which have been sucked up through the apertures of the plug 11. With this construction it is impossible for any fuel in the form of liquid to pass the throttle valve which has in the past been a prolific source of loss in efficiency, although this defect is scarcely possible in my improved apparatus by reason of large number of small holes through which the fuel is led to the main air supply, thus practically preventing all possibility of any defective vaporization even neglecting the effect of the auxiliary air upon the action. It will also be noted that the auxiliary air is led into the mixing chamber from below and is moving in substantially the same general direction as the column of air and fuel.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. In a device of the class described, the combination of a mixing chamber having an air supply opening connected to its bottom, a fuel supply conduit leading centrally to said chamber, a disk mounted on said conduit and having a central hollow portion connected to receive fuel from said conduit, said disk having transversely disposed apertures formed in its edge, and conduits leading from such central hollow portion laterally to such transverse apertures, and other conduits extending from such central hollow portion to the periphery of said disk.

2. In a device of the class described, the combination of a mixing chamber having an air supply opening connected to its bottom, a fuel supply conduit leading centrally to said chamber, a disk mounted on said conduit and of slightly less diameter than the inside of said chamber, said disk having a central hollow portion connected to receive fuel from said conduit, said disk having a plurality of transversely disposed apertures formed in its edge, conduits leading from such central hollow portion laterally to such apertures, and other conduits disposed between such transverse apertures and leading from such central hollow portion to the periphery of said disk.

3. In a device of the class described, the combination of a mixing chamber having an air supply opening connected to its bottom, a fuel supply conduit leading centrally to said chamber, a disk mounted on said conduit and of slightly less diameter than the inside of said chamber, said disk having a central hollow portion connected to receive fuel from said conduit, said disk having a plurality of transversely disposed apertures formed in its edge, conduits leading from such central hollow portion laterally to such apertures, and other conduits disposed between such transverse apertures and leading from such central hollow portion to the periphery of said disk, and means adapted to supply auxiliary air to said chamber above said disk and at an acute angle to the direction of movement of the rising column of air and fuel.

Signed by me, this 14th day of October, 1914.

ANTHONY COSTA.

Attested by—
  Horace B. Fay,
  Anna L. Gill.